United States Patent [19]

Brearley

[11] Patent Number: 5,632,530

[45] Date of Patent: May 27, 1997

[54] ELECTRONIC BRAKING SYSTEM WITH SYSTEM TEST

[75] Inventor: Malcolm Brearley, Solihull, England

[73] Assignee: Lucas Industries PLC., Solihull, England

[21] Appl. No.: 598,073

[22] Filed: Feb. 7, 1996

Related U.S. Application Data

[63] Continuation of Ser. No. 265,120, Jun. 24, 1994, abandoned.

[30] Foreign Application Priority Data

Jun. 26, 1993 [GB] United Kingdom ............. 9313218

[51] Int. Cl.⁶ ................................................ B60T 17/22
[52] U.S. Cl. ..................... 303/22.1; 303/2; 303/9.69; 303/22.4; 303/198
[58] Field of Search .................. 303/22.1–22.8, 303/9.69, 198, 15, 3, 14; 188/195

[56] References Cited

U.S. PATENT DOCUMENTS

| | | | |
|---|---|---|---|
| 4,289,358 | 9/1981 | Dufft et al. | 303/100 |
| 4,657,310 | 4/1987 | Klein | 303/22.1 |
| 4,755,008 | 7/1988 | Imoto et al. | 303/9.69 |
| 4,768,840 | 9/1988 | Sullivan | 303/22.1 |
| 4,795,219 | 1/1989 | Brearley et al. | 303/22.1 |
| 4,861,115 | 8/1989 | Petersen | 303/14 |
| 5,303,986 | 4/1994 | Van De Mlotter et al. | 303/22.1 |

FOREIGN PATENT DOCUMENTS

| | | |
|---|---|---|
| 0283015 | 9/1988 | European Pat. Off. . |
| 0205277 | 2/1990 | European Pat. Off. . |
| 0391047A1 | 10/1990 | European Pat. Off. . |
| 0535392A2 | 4/1993 | European Pat. Off. . |

*Primary Examiner*—Matthew C. Graham
*Attorney, Agent, or Firm*—Oblon, Spivak, McClelland, Maier & Neustadt, P.C.

[57] ABSTRACT

An electronic braking system for a multi-axle road vehicle, having a foot-operable braking transducer which generates electrical braking demand signals representative of a driver's braking demand, load transducers which generate electrical load signals representative of the respective load on different axles of the vehicle, and in electronic controller which receives the braking demand signals and load signals and generates electrical output signals for controlling the operation of braking devices for the wheels carried by axles, the controller including adaptive load compensation device which acts to modify the output signals of the controller to the various braking devices so as to take account of prevailing loads on the respective axles. The system can be brought into a test mode wherein in place of the electrical braking demand signals representative of a drivers braking demand, a preset standard braking input demand is applied to the controller whereby the system generates for testing purposes compensated braking pressures which take into account the operating values of the axle loads.

12 Claims, 3 Drawing Sheets

ELECTRONIC BRAKING SYSTEM WITH SYSTEM TEST

This application is a Continuation of application Ser. No. 08/265,120, filed on Jun. 24 1994, now abandoned.

BACKGROUND OF THE INVENTION

1. Field of the Invention

The present invention relates to electronic braking systems for road vehicles and is concerned with a means of testing the operation of such systems with the vehicle static or substantially static.

2. Description of the Related Art

An electronic braking system (EPB) having compensation for the major disturbance to braking has been described in EP-A-0205277. In the latter system, the level of braking at each axle of a vehicle is made to be proportional to driver braking demand as signified by an electrical signal from a brake pedal and also proportional to axle load as assessed from axle load sensors. Alternatively, for some vehicles which have only small changes in load on particular axles, the operational load value is programmed into the system at final build or it is calculated from other measured axles, for example in the case where a towing vehicle carries a semi-trailer. In the latter case, the front axle load is substantially constant except in so far as a small percentage of the rear axle load increase is passed on to the front axle as a result of the trailer load being applied at some predetermined distance in front of the towing vehicle rear axle.

In all the latter cases, it is assumed that the axle loads are known to the system, and it would be an advantage (and possibly a practical requirement) that the resulting load-sensitive braking distribution should be able to be checked independently from time to time as a service check for test authorities or simply for maintenance purposes.

SUMMARY OF THE INVENTION

Thus, it is an object of the present invention to provide an electronic braking system having means for static testing, or substantially static testing of the load-sensitive braking distribution provided by the system.

In accordance with the present invention, there is provided an electronic braking system which can be instructed to enter a test mode wherein a preset standard braking input demand is applied automatically on the test mode being entered, so that the system statically generates compensated braking pressures which take into account the operating values of axle load. By virtue of this arrangement, the latter pressures can be compared with standard figures issued for the vehicle type for two or more predetermined conditions of applied load.

A preferred system has an electronic braking controller having a special test mode in which a preset braking demand, typically but not necessarily set at a required deceleration of 0.3 g, is applied automatically for test purposes without any need for a driver foot pedal input.

To call up this mode preferably requires certain interlocks to prevent misuse and is not normally available to the driver since it is intended rather as a service check for test authorities or for use by maintenance personnel.

For example, the system can be arranged such that the test mode can only be entered under stationary vehicle conditions or below a preset low speed and is cancelled automatically if the vehicle should move from rest, under power or exceed the preset threshold speed.

In the test mode, all compensations and corrections additional to load-conscious braking are suppressed, allowing braking pressures to be monitored under variable levels of vehicle load. In one preferred system, there are two preset conditions of vehicle load corresponding respectively to the unladen case and a case in which the vehicle is loaded to a predetermined level, with the load being applied in a specified position on the vehicle.

Under these specified conditions of controlled braking demand and axle loading, the acceptable ranges of braking pressure are specified so that tests on vehicles in service can conveniently be made. These tests can check the system and sensor operation and in most cases are made in purely static conditions on a level surface typically found in service garages or test houses, requiring only the means of applying a load to the vehicle.

To perform the test requires that the electronic braking system enter the special test mode where the preset level of braking is applied and other control operations are suspended. This can be achieved in a variety of ways designed so that entry under normal vehicle conditions shall be prevented. The principal interlock is that the vehicle shall be stationary or be operating below a preset speed; where any excess wheel speed will be detected and the test mode cancelled in favor of normal operation.

As long as the vehicle is stationary or alternatively operating below the preset low speed, the test mode can be entered by a combination of test button inputs or, if more convenient for example that the control electronics are chassis-mounted, the entry is signalled by a special code which is sent via a diagnostic input line into the main braking controller. In a preferred arrangement, this code signal has to be repeated at regular intervals or the test mode will be cancelled and the normal operating mode re-assumed.

Advantageously, the test mode is signalled via a pulse or otherwise coded input to the system main braking controller such that this pulse or code has to be repeated at regular intervals in order to maintain the system in the test mode for a further preset period, which is slightly longer than the pulse or code repeat interval.

For vehicles fitted with an electronic braking system having the facility for making corrections to braking signals in response to measurements of the gradient on which the vehicle is operating ("gradient correction"), the vehicle attitude changes will cause braking changes so that vehicles which are on a downhill slope will generate somewhat higher braking pressures for the given braking demand than when in the level condition. This feature can be tested in the test mode by comparing pressure in the down gradient condition with the level condition; the test is more easily done in the unladen state.

Because of the practical difficulties in providing an accurate downhill gradient for service centre testing of vehicles, the electronic braking system can be directed by an alternative pulse or coded signal to enter a further test mode in which there is created a signal offset for the vehicle decelerometer which represents the signal which will be produced by the decelerometer operating on a preset downgrade so that the fixed preset braking demand which is still applied (typically 0.3 g) will produce larger braking pressures in both axles than in the basic test mode, allowing comparison to yield the gradient compensation difference when noted alongside the braking pressure achieved without the simulated gradient being applied (ie. in the first-described, basic test mode).

Thus, some embodiments of the present invention can enable gradient correction to be tested under known load conditions by comparison of braking pressures produced in the vehicle-level condition with those produced in a given gradient attitude with the same automatically generated preset demands, whereby this preset given gradient attitude signal is produced automatically by entering an alternative test sub-mode, even though the vehicle may remain level.

BRIEF DESCRIPTION OF THE DRAWINGS

The invention is described further hereinafter, by way of example only, with reference to the accompanying drawings, in which.

DETAILED DESCRIPTION OF THE PREFERRED EMBODIMENTS

Figure 1:
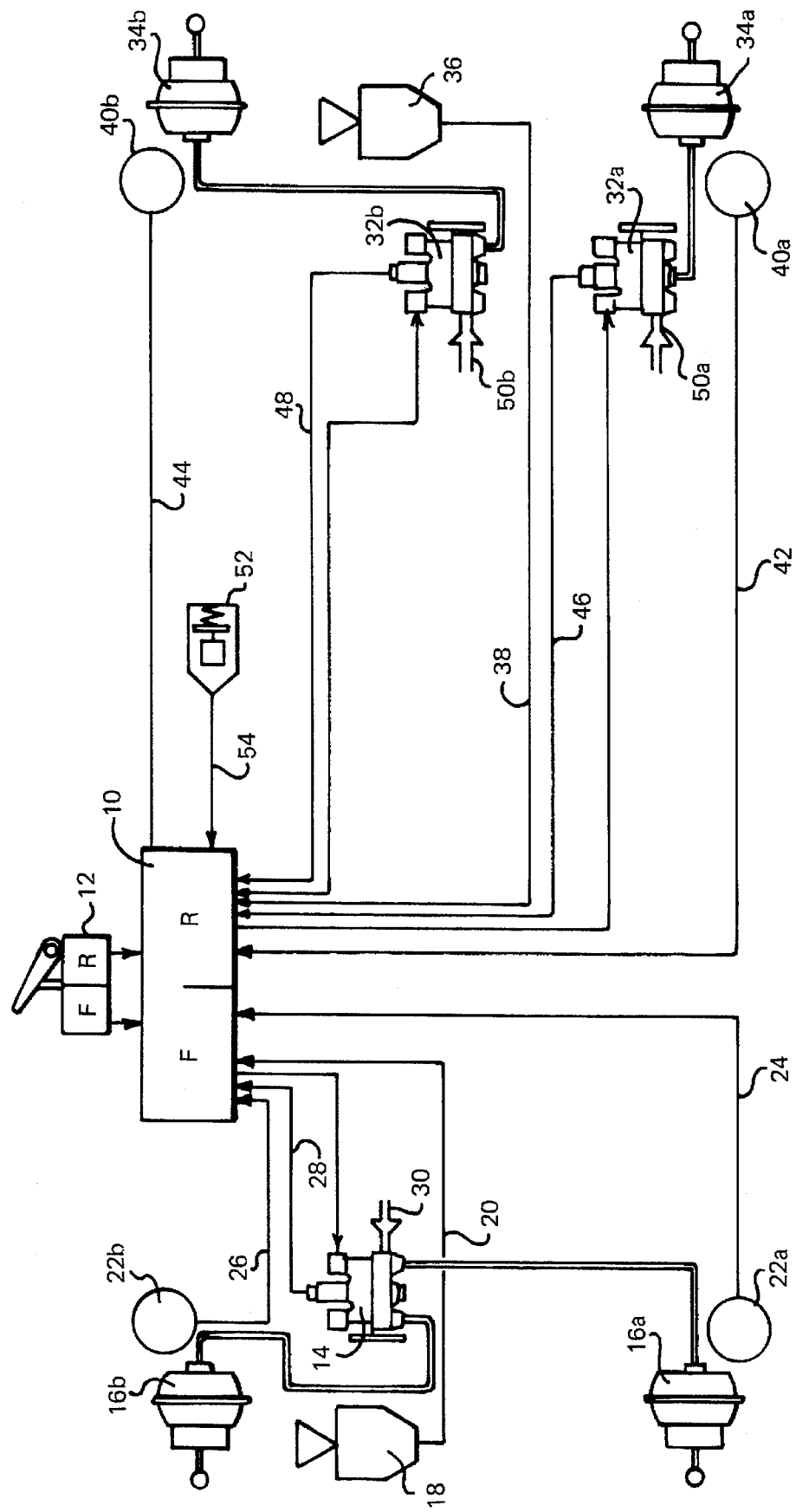
FIG. 1 is a diagrammatic illustration of a typical electronic braking system to which the present invention can be applied.

Referring first to FIG. 1, there is shown the layout of a simple electronic braking system having axle control at the front and individual wheel control at the rear, with axle load sensing on both front and rear axles. Thus, the system includes an EPB controller 10 having separate front and rear control sections which respectively receive front and rear electrical demand signals from a brake pedal operated transducer 12. A single electrical relay valve 14 is associated with the front axle (not shown) and commonly controls left and right wheel brake actuators 16a,16b. A first load sensor 18 provides an electrical signal, representative of the load on the front axle, to the controller 10 via a signal line 20. Wheel speed sensors 22a,22b, associated respectively with the left and right hand front wheels provide wheel speed signals to the controller 10 via signal lines 24 and 26, respectively. An electrical signal representative of the operating pressure P in the relay valve 14 is communicated to the controller 10 via a signal line 28. Reservoir air to the relay valve is supplied via inlet 30.

Separate electric relay valves 32a,32b are associated respectively with the left and right hand rear wheels and control respective left and right hand brake actuators 34a, 34b. A second load sensor 36 provides an electrical signal, representative of the load on the rear axle, to the controller 10 via signal line 38. Wheel speed sensors 40a,40b associated respectively with the left and right hand rear wheels provide wheel speed signals to the controller 10 via signal lines 42 and 44 respectively. Electrical signals representative of the operating pressures P in the relay valves 32a,32b are generated by respective pressure transducers 31a, 31b and communicated to the controller 10 via further signal lines 46 and 48, respectively. Reservoir air to the relay valves 32a, 32b is supplied via respective inlets 50a,5b.

The controller also receives an electrical signal from a vehicle decelerometer 52 via a signal line 54.

The aforegoing system can be operated, for example, in a compensated braking mode as described in detail in our EP-A-205277 in which braking on each axle is made dependent of the load on that axle. Other variations are introduced to compensate for other operating disturbances to braking, such as the effect of a retarder, the operating gradient and the vehicle speed, and corrections can be made to adjust for brake condition. These corrections cause variation in the transfer function relating axle braking pressure to brake pedal demand.

Figure 2:
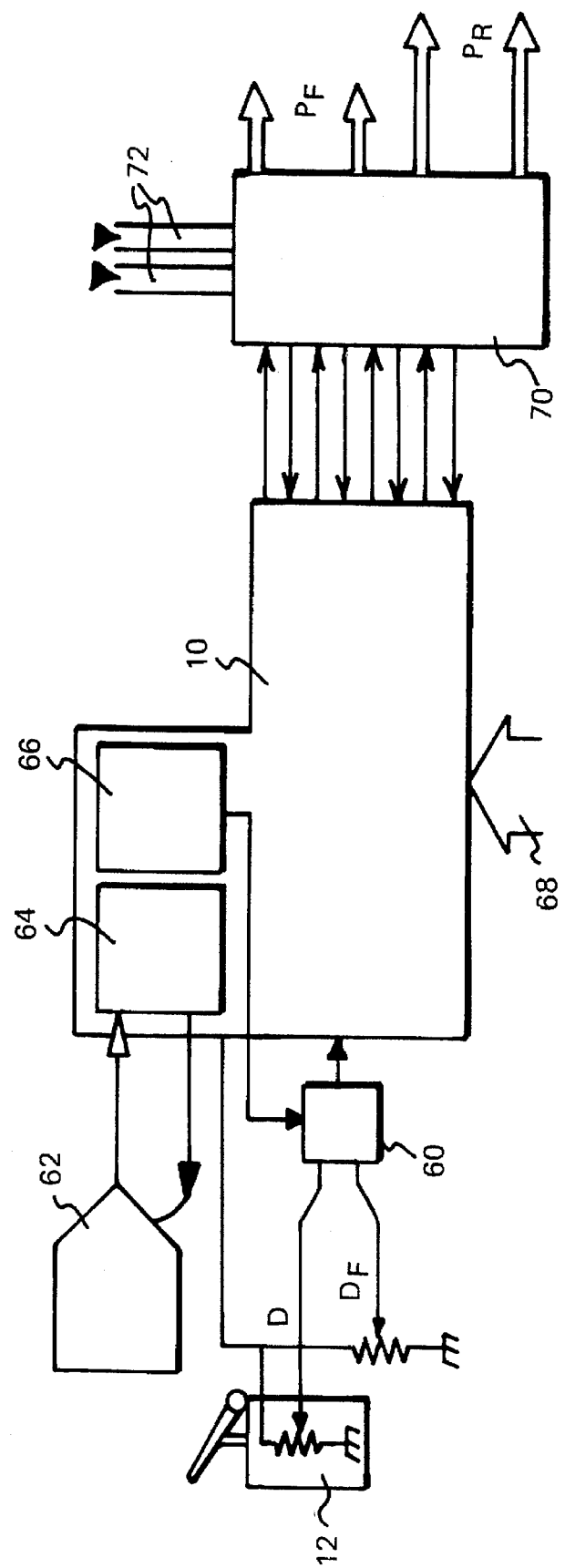
FIG. 2 shows an electronic braking controller modified in accordance with one embodiment of the present invention.

Load variation is the greatest source of disturbance to truck braking and load compensation is therefore a most important adjustment, a means of testing this relationship being provided by the present system. This is illustrated in FIG. 2 in which the braking controller 10 has at least one special test mode in which a reference braking demand DF is applied to the input of the controller 10 to represent a preset mid-range braking figure, typically 0.3 g. The braking pressures caused by this test input will depend primarily on axle loads but are influenced by additional corrections. If this test is done statically with the vehicle in a level attitude, then the resulting braking pressures will depend upon load and adaptive adjustment, which the system has learned, is required to make actual deceleration equal to the demand deceleration. In this test mode, an input selector 60 is controlled via a test mode selector 66 to switch the fixed demand $D_F$ into the controller 10 in place of the normal signal D from the brake pedal transducer 12 and disconnects any adaptive adjustments. When operation in this test mode is required, a diagnostic code is input from a hand-held unit 62 into a diagnostic input via a diagnostic interface 64 and, if accepted by the latter interface, the test mode switching is initiated, thereby switching over the operation of the controller, provided, in this case, the vehicle is detected as being at a standstill. This changeover affects the whole control system as all control channels are switched into the test mode together, and braking pressures responsive to the fixed braking demand $D_F$ are generated in each wheel brake actuator. The latter pressures can be monitored by pressure gauges (shown diagrammatically at locations 33a, 33b, 33c and 33d) inserted into the wheel brake lines for this purpose. Thus, a homogram relating axle load to resulting axle braking pressures can be generated which allows correct operation of the electro-pneumatic system to be checked.

Also shown in FIG. 2 is an input 68 from the vehicle sensors (load, gradient, speed, deceleration), a block 70 representing the control (relay) valves which supply the front axle pressures PF and rear axle pressures $P_R$, and air supply lines 72 from the air reservoir(s).

Figure 3:
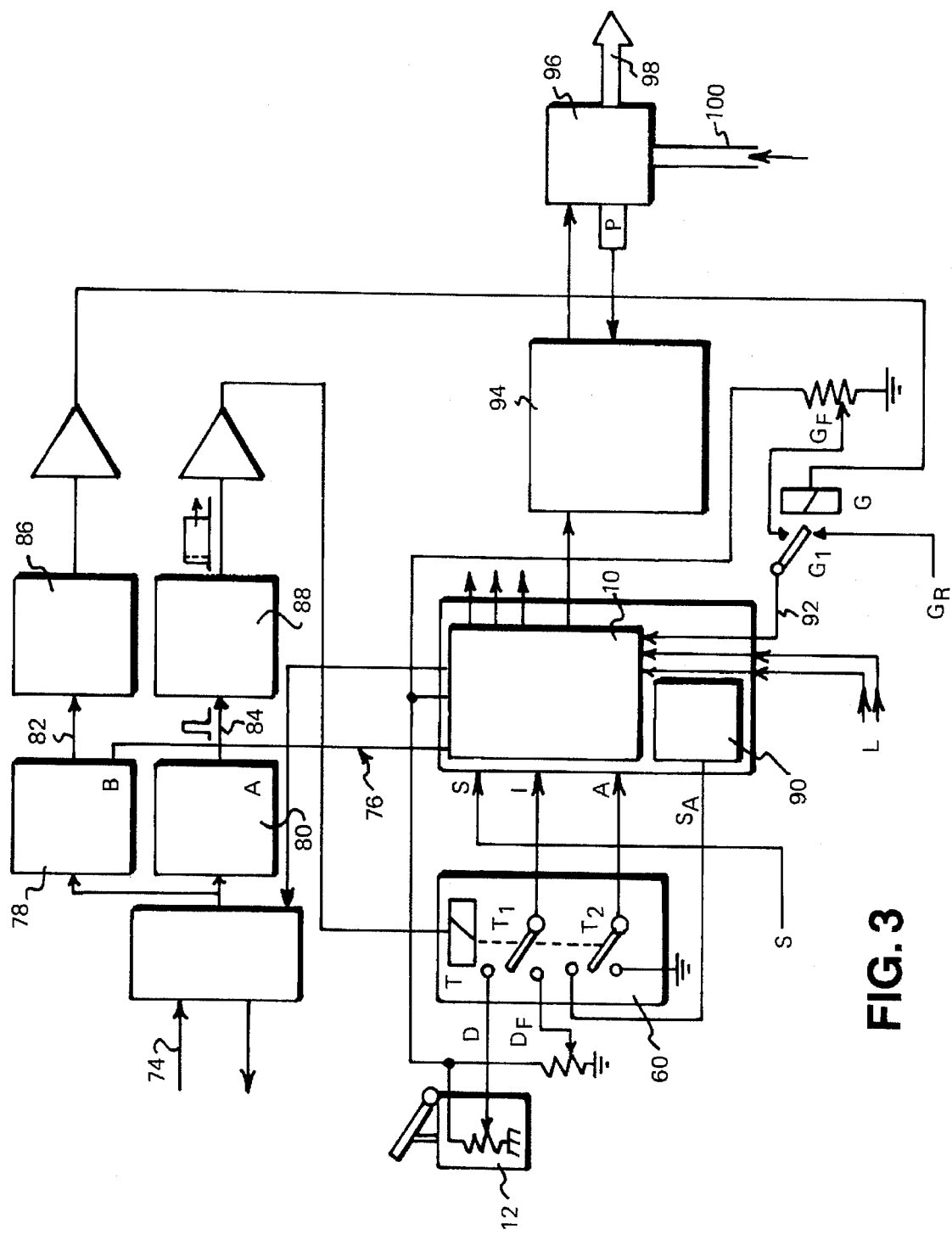
FIG. 3 shows the system of FIG. 2 in more detail.

FIG. 3 shows one possible embodiment of the system of FIG. 2 in more detail. Test codes input via the diagnostic IN line 74 are recognised and accepted provided that a zero speed signal, or a signal to indicate a speed below a preset low level is present from the controller 10 on a line 76, where it is produced by processing the wheel speeds signals S.

Diagnostic code recognition circuits 78,80 are set to recognise a preset data byte code and generate a respective pulse on output lines 82,84 every time such a code is received. These short pulses on lines 82,84 drive respective delay-off timers 86,88 which stretch the pulses considerably, for example as long as 500 ms. If it is desired to maintain this test mode, diagnostic code signals are repeated regularly and at each pulse a new off-delay is repeated. Thus, there is no memory of the test mode internally in the braking controller 10, the test mode being continued only as long as the diagnostic unit 62 is plugged in and the "vehicle at rest" or "substantially at rest" command is being produced on line 76. It is, however, perfectly acceptable to have a test mode memory inside the diagnostic unit 62 as this will be unplugged once the vehicle is moved out of the test area and this memory continues to issue the test codes at the appropriate interval until the test mode is discontinued.

Code A recognition by the diagnostic code recognition circuit 80 causes a test relay T in the selector 60 to be energised, which selects the fixed brake demand $D_F$ and connects this preset signal level to the brake control input pin 1 via relay contact T1. A second contact T2 on this relay T simultaneously disconnects the current adaptive output signal $S_A$, produced by an adaptive control unit 90 in the controller 10, from the braking control circuit and applies a zero correction signal to the controller via pin A. This leaves the braking control with a fixed input signal DF and it generates braking pressure commands for each wheel based upon this input and axle load levels. The resulting pressure values at the individual brakes are read off by the operator and compared against a table of loads and pressures for that vehicle. This test is usually made at two load values at least, and usually one of these is the unladen condition. A further test can be made if the diagnostic unit 62 is adapted to include a display which can show to the operator the pressure within each brakeline, as measured by the E.P.B pressure transducers P. The measurements made in this manner can also be compared against the calibrated gauge measurement as a further test of the EPB system functions.

If the diagnostic unit 62 transmits two codes, both data code recognition circuits 78 and 80 for codes A and B are triggered and the second delay-off timer 86 generates a second mode switching signal to operate a further relay G. The relay contact $G_1$, of the relay G changes the gradient signal input to the controller on line 92 from a measured gradient signal $G_R$ over to a fixed gradient signal $G_F$ which simulates a steep gradient, causing a clearly seen increase in axle braking pressures in response to the continuing fixed demand input signal $D_F$ via contact $T_1$.

Also shown in FIG. 3 are: axle load inputs L, a pressure controller 94, a control valve 96 having an output 98 to a brake and a reservoir air input 100.

I claim:

1. An electronic braking system for a multi-axle road vehicle, comprising:

a foot-operable braking transducer for generating electrical braking demand signals respective of a driver's braking demand, load transducer means for generating electrical load signals representative of the receptor load on different axles of the vehicle, an electronic controller which receives the braking demand signals and load signals and generates electrical output signals for controlling the operation of braking devices for wheels carried by said axles, said controller including adaptive load compensation means which act to modify said output signals of said controller to said various braking devices so as to take account of prevailing loads on the said axles, and an adaptive control means which further modifies said output signals of said controller to compensate for other operating disturbances to braking, test mode control means enabling said system to enter a test mode, and test demand application means for automatically applying to said controller in said test mode and in place of said electrical braking demand signals representative of driver braking demand, a preset standard braking input demand, said test demand application means including compensation suppression control means which, when said test mode is entered, are arranged to suppress all of said other compensations for operation disturbances to braking produced by said adaptive control means to generate for testing purposes load compensated braking pressures which take into account the prevailing values of said axles loads.

2. A system according to claim wherein 1 said other operating disturbances to braking include retarder effects, operating gradient and vehicle speed.

3. A system according to claim 1 including means for detecting whether the vehicle wheel speed is below a predetermined threshold and for enabling the test mode to be entered and maintained only if the vehicle wheel speed is below said threshold.

4. A system according to claim 1 wherein the test mode enabling means signals the test mode being entered by the generation of a pulse input for the controller such that this pulse must be repeated at regular intervals in order to maintain the system in said test mode for a further preset period which is longer that a repeat interval of the pulse.

5. A system according to claim 1 wherein the test mode enabling means signals the test mode being entered by the generation of a code input for the controller such that this code must be repeated at regular intervals in order to maintain the system in this test mode for a further preset period which is longer than a repeat interval of the code.

6. A system according to claim 1 having means to enable the braking pressures to be measured by independent pressure detectors selectably installed in the braking actuators for the purpose of the test.

7. A system according to claim 1 having means internally of the system for measuring the braking pressures and outputting same via a diagnostic output line to a diagnostic interface used in the test.

8. A system according to claim 1 having both a means to enable the braking pressures to be measured by independent pressure detectors selectably installed in the braking actuators for the purpose of the test, and also means internally of the system for measuring the braking pressures and outputting same via a diagnostic output line to a diagnostic interface used in the test to enable a comparison between internally and externally made measurement of the braking pressures.

9. An electronic braking system for multi-axle road vehicle, comprising:

a foot-operable braking transducer for generating electrical braking demand signals representative of a driver's braking demand, load transducer means for generating electrical load signals representative of a respective load on different axles of the vehicle, an electronic controller which receives said braking demand signals and load signals and generates electrical output signals for controlling operation of braking devices for wheels carried by said axles, said controller including adaptive load compensation means which act to modify said output signals of said controller to said various braking devices so as to take account of prevailing loads on said axles, test mode control means enabling said system to enter a test mode, test demand application means for automatically applying to said controller in said test mode and in place of said electronic braking demand signals representative of driver braking demand, a preset standard braking input demand, and gradient detection means for providing said controller with a gradient correction signal representative of a gradient on which the vehicle is disposed, and to enable gradient correction to be tested under preset axle load conditions by comparison of braking pressures produced in a level position against those produced in a given gradient attitude with the same automatically generated preset demand (DF), the system further includes attitude establishing means for establishing a predetermined attitude signal automatically upon an alternative test sub mode being entered even though the vehicle may remain level, said predetermined attitude signal being introduced to said controller in place of said gradient correction signal to provide a simulated gradient correction signal equivalent to that which would be produced on a predetermined gradient by said detection means.

10. A system according to claim 9 having one of means whereby the braking pressures can be measured by independent pressure detectors selectably installed in the braking actuators for the purpose of the test, and means internally within the system for measuring the braking pressures and outputting the measured braking pressures via a diagnostic output line to a diagnostic interface used in the test.

11. A system according to claim 10 having both the facility for use of said independent pressure detectors and said internal braking pressure measurement to enable a comparison between internal and external measurement to made.

12. An electronic braking system for a multi-axle road vehicle, comprising:

a foot-operable braking transducer for generating electrical braking demand signals respective of a driver's braking demand, load transducer means for generating electrical load signals representative of the receptor load on different axles of the vehicle, an electronic controller which receives the braking demand signals and load signals and generates electrical output signals for controlling the operation of braking devices for wheels carried by said axles, said controller including load compensation means which act to modify said output signals of the controller to the various braking devices so as to take account of prevailing loads on the respective axles, means enabling the system to enter a test mode, and means for automatically applying to said controller in said test mode and in place of said electrical braking demand, a preset standard braking input demand, so that the system statically generates compensated braking pressures which take into account the prevailing values of axle load, to enable the latter pressures to be compared with standard figures issued for the vehicle type for at least two predetermined conditions of applied load.

* * * * *